May 26, 1970 R. M. CORSETTI 3,514,122
SHOCK ABSORBING SKID
Filed Nov. 8, 1968
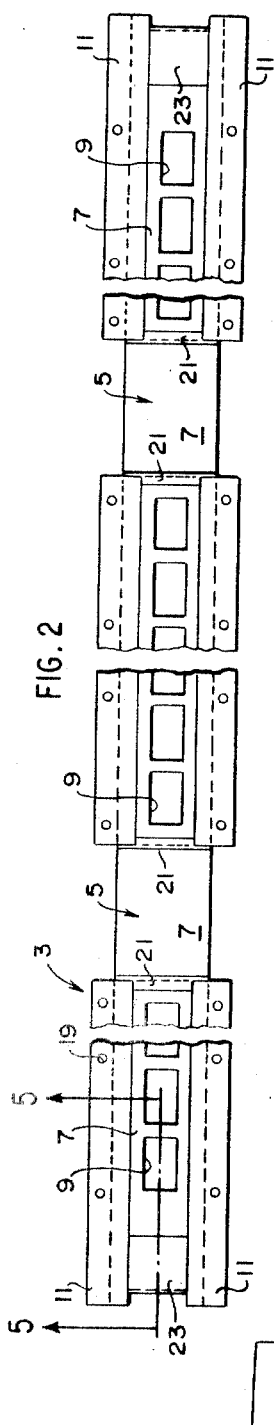
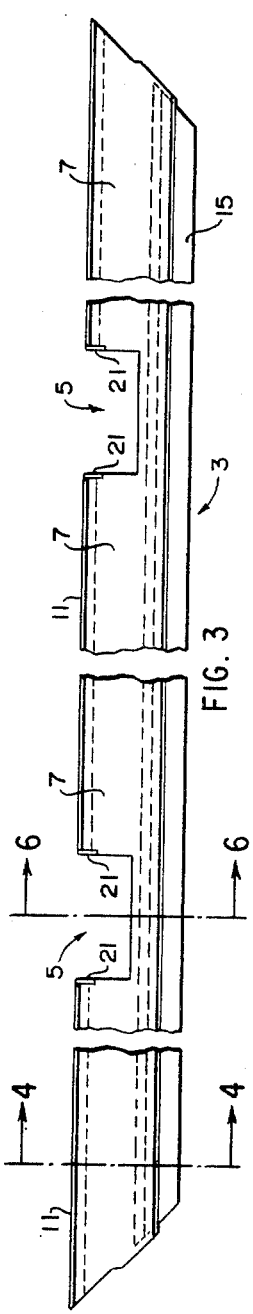
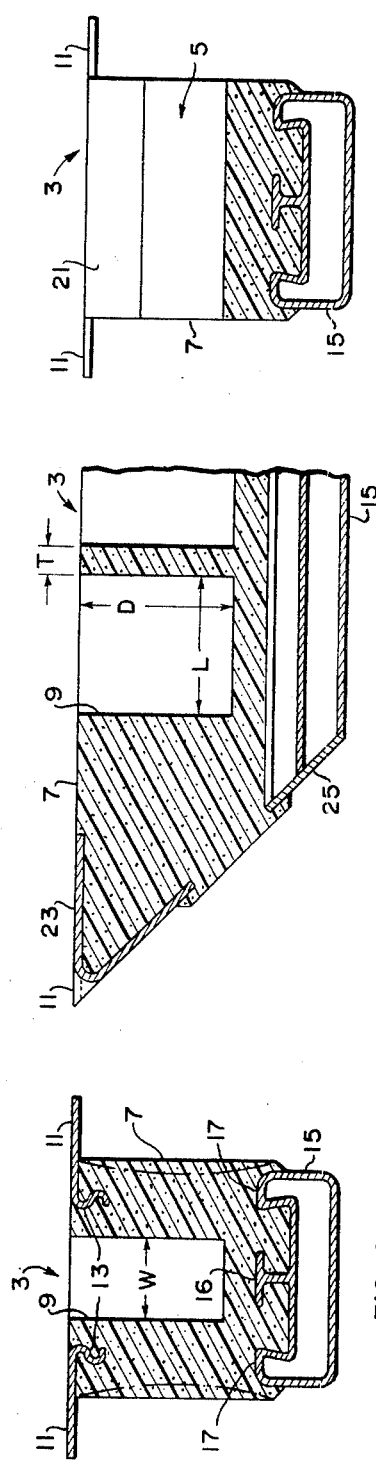
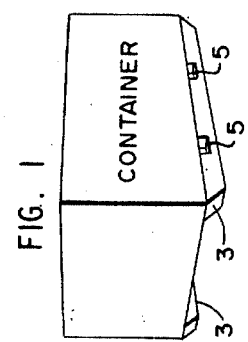
INVENTOR
RICHARD M. CORSETTI
BY *Kenney, Jenney + Hildreth*
ATTORNEYS

United States Patent Office 3,514,122
Patented May 26, 1970

---

3,514,122
SHOCK ABSORBING SKID
Richard M. Corsetti, Lynn, Mass., assignor to Craig Systems Corporation, a corporation of Massachusetts
Filed Nov. 8, 1968, Ser. No. 774,285
Int. Cl. B62b *17/04*
U.S. Cl. 280—25
2 Claims

ABSTRACT OF THE DISCLOSURE

A shock absorbing skid for use in supporting a container that may be dropped or dragged over rough terrain to absorb acceleration and acceleration changes, comprising an elongated composite beam of high density flexible compressible foam material formed with a series of apertures intermediate its ends to modify it in stiffness and connected at the bottom to a metal shoe and at the top to a pair of connecting plates adapted to be secured to the container.

---

My invention relates to transportation, and particularly to a novel shock absorbing skid for protecting articles such as containers from damage during transport.

Despite numerous improvements in transportation, it is still common for damage to occur in shipping, particularly when a container or other object is put on or taken from a vehicle, or when an object which is too heavy to lift manually must be moved from one place to another. Even more rigorous conditions are at times encountered when objects must be delivered by dropping them from an aircraft. The object of my invention is to protect articles that are subject to rough treatment by averaging the accelerations to which they may be exposed over a sufficient period of time to avoid permanent damage.

Briefly, the above and other objects of my invention are attained by supporting a container or other article subject to rough treatment on a plurality of skids, each of a novel construction to be described which is reversibly deformable under a suddenly applied load to absorb the shock and greatly reduce the maximum acceleration and rate of decelleration to which the object is exposed when it is dropped or dragged over rough terrain. A shock absorbing skid in accordance with my invention comprises an elongated beam of high density compressible flexible foam material which is formed intermediate its ends with a series of apertures that modify it in stiffness, without reducing its basic hardness and compressibility, and which permit the beam to deform more radically than a simple beam could withstand without permanent deformation or rupture. The beam is formed at the bottom with a metal shoe serving as a relatively low friction ground engaging member to resisting cutting, tearing and abrasion, as well as serving to prevent the transmission of local stresses through the foam beam to the structure to be supported by the skid. Connected to the foam beam at its upper side are a pair of metal plates that serve to connect the assembly to the structure to be supported, and to distribute the load in the beam.

The construction of the apparatus of my invention, and its mode of operation, will best be understood in light of the following detailed description, together with the accompanying drawings, of a preferred embodiment thereof.

In the drawings,

FIG. 1 is an orthogonal and schematic sketch of a container mounted on skids in accordance with my invention:

FIG. 2 is a plan view, with parts broken away, of a skid in accordance with my invention;

FIG. 3 is an elevational view of the apparatus of FIG. 2 with parts broken away;

FIG. 4 is a cross-sectional view of the apparatus of FIGS. 2 and 3, on an enlarged scale, taken essentially along the lines 4—4 in FIG. 3;

FIG. 5 is an enlarged, fragmentary cross-sectional view of the apparatus of FIGS. 2 and 3, taken essentially along the lines 5—5 in FIG. 2; and FIG. 6 is an enlarged cross-sectional view of the apparatus of FIGS. 2 and 3, taken substantially along the lines 6—6 in FIG. 3.

Referring to FIG. 1, I have shown a container 1 mounted upon skids 3 to be supported and protected against shocks thereby. As indicated, each skid is provided with a pair of rectangular openings 5 to admit the lifting shoes of a forklift truck, or a pair of jacks or the like, to assist in moving the container 1 from place to place. As will appear, the function of the skids 3 is performed when the container is dragged from one place to another or when it is dropped, either accidentally or deliberately, during its movement from one place to another.

FIGS. 2 through 6 show the details of the construction of the skid 3 in accordance with a preferred embodiment of my invention.

The basic shock absorbing element comprises an elongated block 7 of compressible resilient foam material, preferably a relatively high density polyurethane foam of the closed cell variety and having a density of approximately 22.5 pounds per cubic foot. That material is quite rugged and resistant to wear and abrasion, and if used in solid block form would be substantially too unyielding for the intended purpose of absorbing shock. Accordingly, I prefer to modify it by incorporating a series of apertures 9 intermediate its length, conveniently formed as rectangular cavities or pockets in the polyurethane foam by means of a suitable mold part inserted during the curing of the foam. A typical proportioning of these pockets, for a skid in which the beam 7 is 3¼ inches deep and approximately 3 inches in width, would involve pockets 9 with a width W equal to 1 inch, a depth D equal to 2½ inches, and a length L equal to 2 inches. The thickness T of the web between two adjacent pockets 9 (FIG. 5) would be ⅜ inches.

The density of the foam may be varied somewhat in dependance on the maximum static load to be supported and the expected severity of the conditions of use. Too low a density would cause the skid to deform under the static load of the article supported on it. At the other extreme, an unduly high density foam does not have the desired shock absorbing properties, and has an undesirably high weight. In practice, about 22 pounds per cubic foot is preferred, and is near the lower practical limit. About 40 pounds per cubic foot would be the upper practical limit, with considerably better results to be expected nearer the lower end of the range than the upper. For the particular example given, the volume of the pockets, or void space, is approximately one-fourth of the volume of the foam; for a lighter foam, the void space would be somewhat decreased, and for a denser foam, the void space increased, to retain the desired flexural properties of the composite beam.

At the top of each beam 3 are a pair of L-shaped metal mounting members or plates 11, of aluminum or the like, having convoluted flanges 13 embedded in the block 7 in interlocking relationship therewith. At the bottom of the skid is a metal shoe 15, of extruded aluminum or the like, having upstanding flanges such as 16 and 17 embedded in the block 7. In practice, the top plates 11 and the shoe 15 are placed in a mold and the polyurethane beam 7 is formed by casting in the mold to essentially the configuration shown with the cavities or pockets 9 opening upwardly between the members 11. The plates 11 may be provided with apertures, as indicated at 19 in FIG. 2, to facilitate their connection to the container 1.

As indicated in FIGS. 2 and 6, the corners of the beam formed at the ends of the lift openings 5 are preferably protected by metal connecting plates 21, comprising angles of aluminum or the like, welded to the connecting plates 11.

As shown in FIG. 5 the ends of the skid may be capped by toe plates 23 welded between the plates 11 and forming a rigid connection between them at their ends. The ends of the shoe 15 may be closed by a metal plate 25 welded to it.

In operation, the shoe 15 functions to reduce friction when the container 1 is dragged along the ground and also serves to prevent local loads from being transmitted to the container through the relatively compressible beam 7. For example, if the container 1 is transported by rolling the shoes over rollers of a relatively small radius, such as 2 inch pipes, for example, the large local stresses would be distributed by the shoe 15 and absorbed through the block 7 rather than being directly transmitted to the container. If the container is dropped, the block 7 absorbs the load by deformation, to the configuration suggested by the dotted lines in FIG. 4, or to other particular configurations depending on the angle of impact. The skid resumes its shape over a time period that is large with respect to the period of peak acceleration, so that the maximum acceleration transmitted to the container is much less than the maximum acceleration applied to the shoe 15. In practice, the normal acceleration levels experienced due to dropping can be attenuated down to approximately 20 to 25 times the acceleration due to gravity with the construction described. Thus, the skid greatly facilitates the shipment and handling of shelters, pallets, shipping containers and the like, and makes the protection against shock of the contained or permanently installed equipment a practical procedure.

While I have described my invention with respect to the details of a preferred embodiment thereof, many changes and variations will be apparent to those skilled in the art upon reading my description, and such can obviously be made without departing from the scope of my invention.

Having thus described my invention, what I claim is:

1. A shock absorbing skid comprising: a horizontally elongate block of a dense, resilient closed-cell plastic foam material; an elongate metallic shoe member extending along the bottom surface of said block and having an upstanding portion with a lateral projection thereon embedded in said material in interlocking relationship therewith; and a pair of elongate metallic mounting members extending along opposite sides of the upper surface of said block, each of said members being of generally L-shaped cross-section having a depending convoluted flange portion embedded in said material in interlocking relationship therewith and having also a laterally projecting flange portion extending beyond said block on the respective side, said laterally projecting flange portions being adapted for attachment to a load which is to be supported on said skid, said block being formed with a plurality of cavities which are spaced along the length of the block and which open upwardly between said mounting members, said shoe being connected to said mounting members substantially only through said block, thereby to cause the block to absorb substantially all lateral and vertical shock loads between said mounting members and shoes.

2. A skid as set forth in claim 1 wherein said block comprises polyurethane foam having a density of about 22 pounds per cubic foot and wherein the volume of said cavities is about one-fourth of the volume of said block.

References Cited

UNITED STATES PATENTS

| | | | |
|---|---|---|---|
| 2,319,690 | 5/1943 | Karpen. | |
| 2,869,811 | 1/1959 | Boschi. | |
| 3,105,697 | 10/1963 | Weaver | 280—25 |
| 2,519,839 | 8/1950 | Leisen | 108—58 |

BENJAMIN HERSH, Primary Examiner

R. R. SONG, Assistant Examiner